United States Patent [19]
Byrne

[11] Patent Number: 5,423,126
[45] Date of Patent: * Jun. 13, 1995

[54] FLEXIBLE FLAIL TRIMMER

[76] Inventor: Steven E. Byrne, 10787 Big Bone Church Rd., Union, Ky. 41091

[*] Notice: The portion of the term of this patent subsequent to May 26, 2009 has been disclaimed.

[21] Appl. No.: 15,461

[22] Filed: Feb. 9, 1993

[51] Int. Cl.⁶ ..................... A01D 34/73; A01D 34/82
[52] U.S. Cl. ........................ 30/276; 30/347; 30/286; 56/12.7
[58] Field of Search .......... 30/276, 347, 286; 172/508, 13, 15; 56/12.7, 17.4, DIG. 24

[56] References Cited

U.S. PATENT DOCUMENTS

| | | |
|---|---|---|
| 2,263,431 | 11/1941 | White . |
| 2,707,859 | 5/1955 | Walker . |
| 2,708,335 | 5/1955 | Newton . |
| 2,725,813 | 12/1955 | Stoeber . |
| 2,832,184 | 4/1958 | Beuerle . |
| 2,952,110 | 9/1960 | Blanchard . |
| 3,006,421 | 10/1961 | Feilbach . |
| 3,208,209 | 9/1965 | Dunlap et al. . |
| 3,656,286 | 4/1972 | Glunk et al. ............ 56/294 |
| 3,708,967 | 1/1973 | Geist et al. ............ 56/12.7 |
| 3,788,049 | 1/1974 | Ehrlich ............ 56/16.9 |
| 3,831,278 | 8/1974 | Voglesonger ............ 30/276 |
| 3,872,930 | 3/1975 | Campbell . |
| 4,091,536 | 5/1978 | Bartholomew ............ 30/276 |
| 4,107,841 | 8/1978 | Rebhun ............ 30/276 |
| 4,118,865 | 10/1978 | Jacyno et al. ............ 30/276 |
| 4,190,954 | 3/1980 | Walto ............ 30/347 |
| 4,202,094 | 5/1980 | Kalmar ............ 30/276 |
| 4,224,784 | 9/1980 | Hansen et al. ............ 56/16.9 |
| 4,268,964 | 5/1981 | Moore ............ 30/276 |
| 4,442,659 | 4/1984 | Enbusk ............ 56/12.7 |
| 4,587,800 | 5/1986 | Jimenez ............ 56/16.9 |
| 4,641,431 | 2/1987 | Leming et al. ............ 30/276 |
| 4,679,385 | 7/1987 | Carmine ............ 56/16.9 |
| 4,712,363 | 12/1987 | Claborn ............ 56/16.7 |
| 4,756,148 | 7/1988 | Gander et al. ............ 56/17.2 |
| 4,794,836 | 1/1989 | Villani ............ 30/347 |
| 4,803,831 | 2/1989 | Carmine ............ 56/16.9 |
| 4,914,899 | 4/1990 | Carmine ............ 56/16.7 |
| 5,010,720 | 4/1991 | Corsi ............ 56/320.1 |
| 5,023,998 | 6/1991 | Masciarella et al. ............ 56/12.7 |
| 5,029,435 | 7/1991 | Buchanan ............ 56/12.1 |
| 5,115,870 | 5/1992 | Byrne ............ 172/15 |

FOREIGN PATENT DOCUMENTS

| | | |
|---|---|---|
| 157734 | 2/1955 | Australia . |
| 6919842 | 11/1969 | Germany . |
| 3506717 | 8/1986 | Germany . |

OTHER PUBLICATIONS

Advertisement, "Trim-A-Lawn", Trim-A-Lawn Corporation, 1031 Park Drive #2, Indian Harbour Beach, Fla. 32927, 1991.

*Primary Examiner*—Hwei Siu Payer
*Attorney, Agent, or Firm*—Wood, Herron & Evans

[57] ABSTRACT

A flexible flail trimmer for conventional trimming of grass, weeds and other vegetation and for edging of sidewalks includes a rotatable combined guide and guard having a depth gage for providing positive vertical indexing during an edging operation. A trimmer is further disclosed as having a rotatable guide and guard which may be selectively fixed in a nonrotatable position. In this nonrotatable position, a second, rear guard may be attached to provide protection to the operator during conventional trimming operations. In further aspects, trimmer guards are disclosed for stabilizing the rotating flail to provide a cleaner, more even cut when the trimmer is used in conventional trimming operations.

19 Claims, 4 Drawing Sheets

FLEXIBLE FLAIL TRIMMER

BACKGROUND OF THE INVENTION

The present invention relates to flexible flail trimmers for trimming and edging grass and cutting weeds and other vegetation. More particularly, the invention is directed to an apparatus guiding such trimmers during the edging operation, stabilizing the flail as it rotates, and protecting the operator from thrown debris during the trimming operation.

The invention presents certain improvements over the flexible flail trimmer and combined guide and guard disclosed in my previous patent, U.S. Pat. No. 5,115,870 (hereinafter the '870 patent), which was issued on May 26, 1992. U.S. Pat. No. 5,115,870 is fully and expressly incorporated by reference herein.

The '870 patent discloses a flexible flail trimmer having a rotatable guide and guard mounted inboard of a rotating cutting head and having indexing means for guiding the apparatus in both horizontal and vertical directions. In one embodiment, the combined guide and guard takes the form of a truncated cone and in another embodiment the combined guide and guard is a truncated hemisphere. In both embodiments, the combined guide and guard includes a circumferential lip extending radially outwardly from the base of the truncated cone or hemisphere. The lip extends outwardly in a plane parallel to the plane of the rotating flail. The outboard lip surface in effect provides a bearing surface against which the flail bears during rotation. The end of the flail extends radially beyond the edge of the lip as the flail rotates to provide the desired cutting action.

Among the advantages of the trimmer disclosed in the '870 patent is the ability to use the trimmer with the guide and guard oriented either vertically during edging operations or horizontally during conventional trimming operations. While using the trimmer in an edging operation, the user may orient the axis of rotation of the cutting head generally parallel to a lawn surface by rolling the junction between the circumferential lip and the base of the guide and guard along a sidewalk corner formed by its vertical edge and horizontal top surface. This juncture of the guide and guard effectively provides a means for indexing the trimmer both vertically and horizontally along a sidewalk edge such that the trimmer follows the sidewalk edge at a uniform vertical depth and horizontal distance to produce a neatly trimmed lawn edge.

Another advantage realized from the '870 device is that the circumferential lip of the combined guide and guard stabilizes undesirable wobble in the flail along substantially the entire length of the flail. In other trimmers in which flail wobble is not stabilized, the wobble tends to cause the spinning flail to produce rough, uneven cutting during both edging operations and conventional trimming operations. The '870 device, however, helps to produce more even cutting in conventional trimming operations. Also, since the flail tip retains a small amount of wobble, the flail tip clears a path which is wider that the diameter of the flail to provide a leading groove in the soil in which the lip rides during an edging operation.

Further advantages of the trimmer and guide/guard of the '870 patent include the ability to use one piece of equipment to perform two different lawncare operations, namely, trimming and edging. As a result, the total time taken to trim and edge a lawn is significantly reduced through the use of this single device. Also, the guide and guard provides the user protection from thrown debris during either trimming or edging operations. Finally, less debris is thrown and soil excavated during the edging operation therefore speeding the operation, reducing clean-up time, and necessitating less horsepower than conventional bladed edgers.

While the '870 patent discloses a trimmer and guide/guard having the many advantages cited above, the present invention contemplates certain improvements thereon related to trimming accuracy, flail stabilization and improved protection from thrown debris. In this regard, although the junction between the base of the guide/guard and the lip may be effectively used as an indexing means during an edging operation as described above, care must be taken by the operator not to allow the guide/guard to descend along the edge of the sidewalk so as to dig too deeply into the soil and/or produce a cut which strays from the edge of the sidewalk. This is especially true of the truncated cone embodiment of the '870 patent in which the straight, upper surface of the guide/guard may tend to slide down against the corner of the sidewalk unless the operator carefully maintains the outboard surface of the circumferential lip against the edge of the sidewalk.

In addition, the '870 patent does not present a way to protect the operator from debris thrown rearwardly from the cutting head. In this regard, the rotating nature of that guide/guard prevents a conventionally shaped rear guard from being attached to the guide/guard to protect the user.

Moreover, although the wobble produced at the end of the flail outside of the circumferential lip tends to advantageously form a leading groove in the soil during an edging operation, it may also serve to prevent an ideal, clean cut from being made during a conventional trimming operation where the guide/guard is oriented horizontally. For example, while using the trimmer horizontally on a lawn, the wobble at the end of the flail will tend to cause an uneven or rough cut along the top surface of the lawn.

Of course, the wobble of the flail in a conventional trimmer is much greater, and therefore produces a much less desirable cut, than that produced by the trimmer disclosed in the '870 patent. This is due to the circumferential lip of the guide/guard of the '870 patent which acts as a bearing surface for the rotating flail and thereby stabilizes the flail along almost the entire length of the flail. Therefore, past conventional trimmers suffer from the disadvantage of having relatively large amounts of wobble in the rotating flail while the trimmer disclosed in the '870 patent still retains a small amount of wobble in the rotating flail in the tip portion of the flail extending radially outwardly from the periphery of the guide/guard.

Accordingly, it has been one objective of the present invention to provide an improved indexing means to positively limit the vertical movement of the guide/guard during an edging operation and allow an operator to more easily keep the trimmer against the edge of the sidewalk and cut at a uniform depth during the edging operation.

A further object of the invention has been to provide a trimmer having a guide/guard which is convertible from a rotatable design used in edging operations to a nonrotatable design having a rear guard for protecting the operator during trimming operations in which the guide/guard is used in a generally horizontal orientation.

A still further object of the invention has been to produce an improved apparatus for stabilizing a flexible flail of a trimmer to provide cleaner, more even cuts when trimming.

SUMMARY OF THE INVENTION

To these ends, a preferred embodiment of the present invention provides a trimming and lawn edging apparatus including an indexing means or depth gage in the form of a surface on an inboard side of a guide/guard which is perpendicular to the plane of the rotating flail. The depth gage preferably takes the form of a ring removably attached to the inboard side of a trimmer guard such as the guide/guard disclosed in the '870 patent. However, the depth gage could also easily be formed integrally with the trimmer guard.

When using a guide/guard such as that disclosed in the '870 patent, the ring is preferably attached at the juncture formed between the base of the guide/guard and the circumferential lip such that the outside surface of the ring and the inboard surface of the lip are at right angles to each other. In this way, the outside surface of the ring functions as a vertical index or depth gage which rolls along the top surface of a sidewalk and the inboard surface of the lip serves as a horizontal index which bears against a side edge surface of the sidewalk during an edging operation.

The depth gage may alternatively be formed integrally with the guide/guard by simply forming the guide/guard with an outer surface adjacent and at right angles to the inboard surface of the circumferential lip. However, the design incorporating a detachable ring allows the trimmer to be used without the ring at a wider variety of useful angles, for example, for trimming around irregularly-shaped objects.

In another embodiment of the invention, means are provided for converting the guide and guard of a trimmer between a rotatable design in which the trimmer may be used in edging operations and a nonrotatable design in which the trimmer may by used in other conventional trimming operations. This is preferably accomplished by a fastener removably attached between the guide/guard and the bushing or bearing which normally allows the guide/guard to rotate. For situations in which the fastener has been employed to fix the guide/guard in a nonrotatable position, a rear guard is provided and is removably attachable to the fixed guide/guard in a position between the rotating flail and the operator to protect the operator from thrown debris.

In a further embodiment of the invention a sloping surface is provided on the outboard side of a trimmer guard to stabilize the rotating flail. Two different guards are alternatively contemplated by the present invention to achieve this stabilizing effect.

In one alternative, the guide/guard is designed and functions similarly to the guide/guard disclosed in the '870 patent except that a flail stabilizing "tunnel" is provided along a portion of the outboard side of the guide/guard. The tunnel includes a "capture portion" which defines the entrance to the tunnel and serves to allow a tip portion of the rotating flail to enter the tunnel without hitting the edge of the guard structure. The tunnel has a top inner surface which slopes in an outboard direction from the entrance or capture portion of the tunnel to the tunnel exit. The slope of the top surface gradually reduces the amplitude of the wobble at the tip portion of the flail as it rotates. The tunnel is located radially outward of the circumferential lip along an angular portion of the guide/guard. This angular portion of the guide/guard approximately encompasses a 90° segment at the rear of the guide/guard but segments ranging from 45°–120° are also contemplated by the invention.

In a second alternative, a flail stabilizing guard is provided for use on a conventional string trimmer and comprises a guard configured to cover only a portion, e.g., one-quarter, of the path of the rotating flail. This partial guard is adapted to be attached to the rear of the trimmer to protect the operator in a conventional manner but includes a sloping outboard surface which serves to significantly reduce the wobble in the rotating flail, The guard includes an entrance end and an exit end and the outboard surface of the guard slopes in an outboard direction from the entrance end to the exit end. Like the top surface of the tunnel in the first alternative mentioned above, the slope of the guard's outboard surface gradually reduces the amplitude of the flail's wobble as the flail rotates beneath the guard.

Accordingly, one advantage of the present invention over past string trimmers is that more accurate lawn edging is accomplished through the incorporation of improved vertical indexing or depth gage structure on the guide/guard of the trimmer.

Another advantage is that the depth gage may be removed to convert the trimmer from an edging device to a more versatile and maneuverable trimming apparatus.

The invention further provides a flexible flail trimmer having a rotatable guide/guard which may be selectively fixed in a nonrotatable position so that a rear guard may be attached to the guide/guard to convert the trimmer from a lawn edging device to a grass and vegetation trimmer which protects the operator from thrown debris.

Finally, flail stabilization means are provided which significantly reduce the wobble in the flail as it rotates thus causing the trimmer to produce a cleaner, more even cut in the top surface of a lawn.

Further objects and advantages of the invention will become readily apparent to those of ordinary skill in the art from the following detailed description taken in conjunction with the accompanying drawings.

DESCRIPTION OF THE PREFERRED EMBODIMENT

Figure 1:
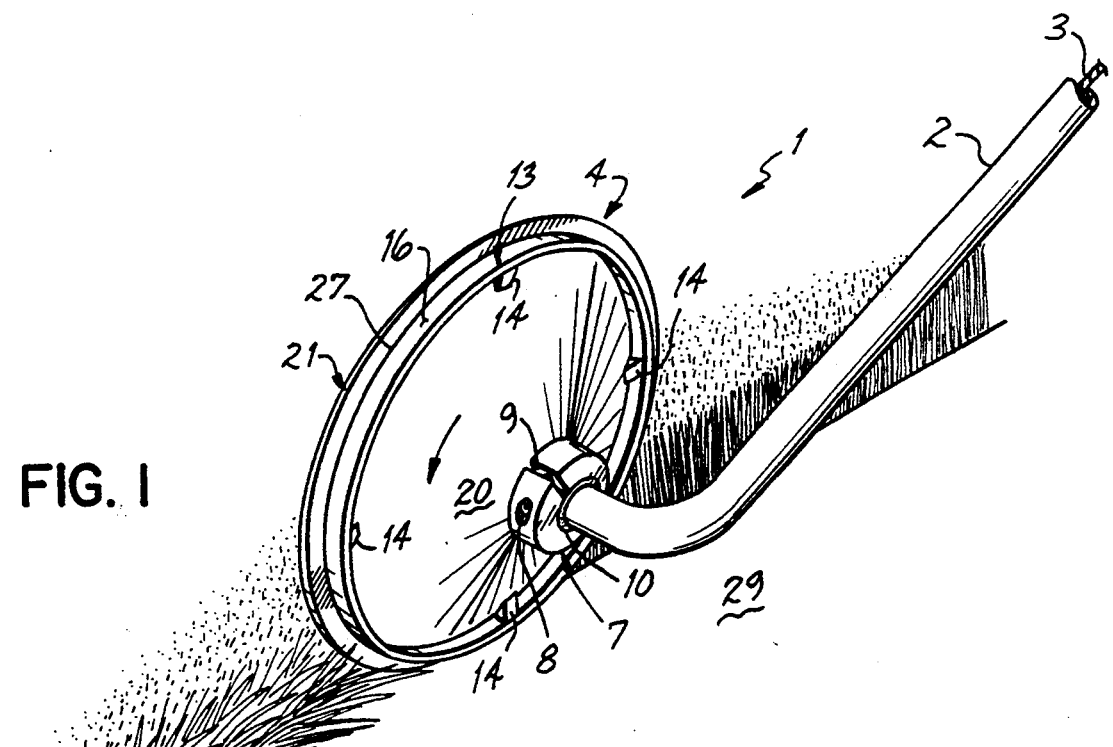
FIG. 1 is a perspective view of a first embodiment of the flexible flail trimmer of the present invention shown being used during an edging operation.
Figure 2:
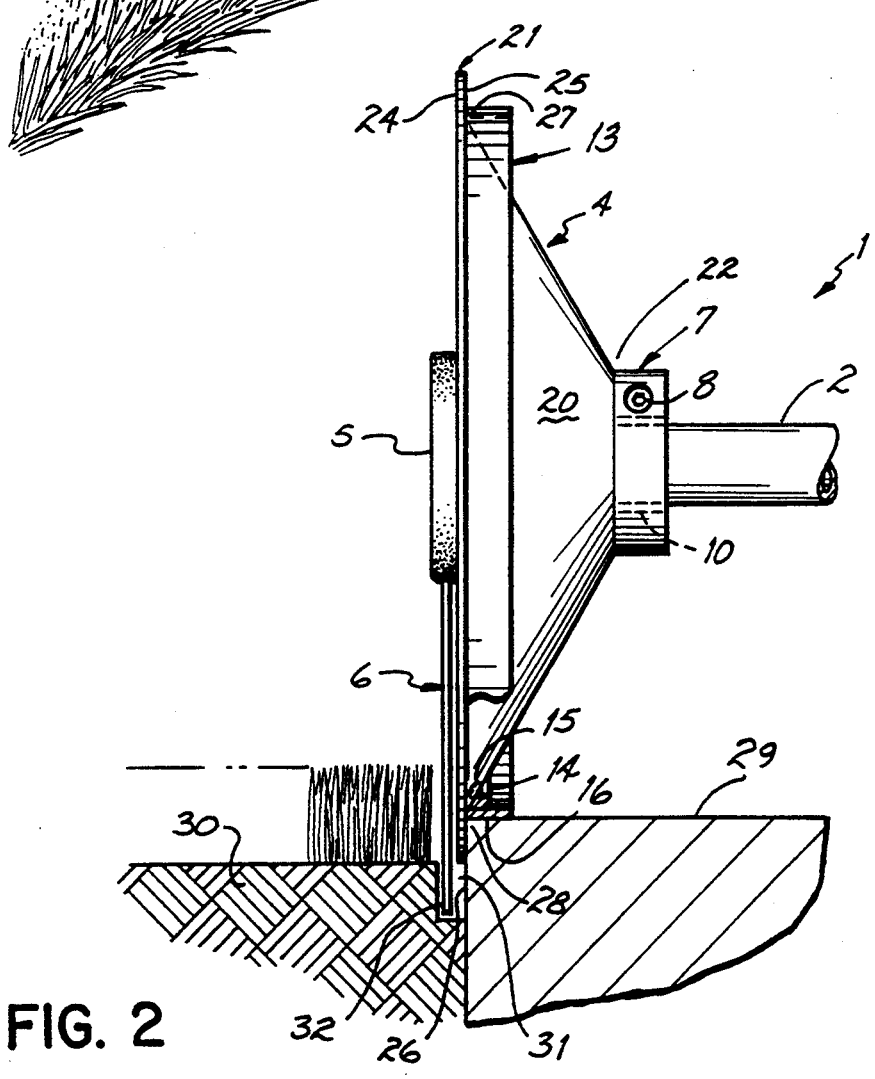
FIG. 2 is a front elevational view showing the trimmer of FIG. 1 during the edging operation.

Referring to FIGS. 1 and 2, one preferred embodiment of the present invention includes a flexible flail trimmer 1 having a handle comprising a nonrotating or fixed hollow, tubular shaft or housing 2, a rotating flexible drive shaft 3, a combined dual function guide and guard 4, a rotatable flail storage or cutting head 5, including a flexible flail 6, and drive means such as an internal combustion engine (not shown), which may be attached at the upper end of the handle shaft 2. The invention is also easily adapted to be used with a straight shaft, gear head, flexible flail trimmer.

The combined guide and guard 4 is attached at the lower end of the handle shaft 2 by a clamp collar 7 and bushing 10, such that the guide and guard 4 rotates around the handle shaft 2 independently of the flexible drive shaft 3 and cutting head 5. Thus, as shown in FIG. 1, a user may roll the guide and guard 4 along a sidewalk edge 28 and the guide and guard 4 will rotate like a wheel as the flexible flail spins to cut the grass along the edge of the sidewalk. The guide and guard 4 is mounted inboard of the cutting head 5 relative to the handle shaft 2 and thus is disposed between the cutting head 5 and the user grasping the handle shaft 2.

The combined guide and guard 4 is generally in the shape of a truncated cone 20 having a circumferential lip 21 extending radially outwardly from the base of the truncated 20. The cone 20 is truncated at the top 22 where the cone 20 meets the clamp collar 7 and bushing 10. The attachment of the cone 20 to the handle shaft 2 via the clamp collar 7 and bushing 10 will be described in more detail below with reference to FIGS. 4 and 4A, A depth gage is provided on an inboard surface of the guide and guard 4 and preferably takes the form of a ring 13 attached to the inboard surface of the cone 20 by ring supports 14 and screw fasteners 15 threaded through the cone 20 from an outboard surface thereof into the ring supports 14. The ring 13 is attached to the cone 20 so as to be positioned at the junction 27 located at the base of the truncated cone 20 between the cone 20 and the circumferential lip 21.

As shown best in FIG. 2, the flexible flail 6 extending from the cutting head 5 rotates in a plane immediately outboard of a plane defined by the outboard surface 24 of the circumferential lip 21. The distance between the flail 6 and the outboard surface 24 of the lip 21 has been greatly exaggerated in FIG. 2 for illustrative purposes. In actuality, the flail 6 will bear against the outboard surface 24 of the lip 21 as it rotates such that the wobble of the flail 6 will be stabilized out to the periphery of the lip 21. A small amount of wobble will remain in the outer end 32 of the flail 6 which extends radially outwardly from the circumferential lip 21.

FIG. 2 illustrates an "ideal" edging scenario wherein the sidewalk is frequently edged and the soil 30 contains a groove 31 formed by an outer most end portion 32 of the flail 6 as the guide and guard 4 is rolled along the corner 28 of the sidewalk. The width of the groove 31 in the soil 30 is also exaggerated for illustrative purposes but will be wider than the width of the flail due to the small amount of wobble in the outer end or tip portion 32 of the flail 6. The tip portion 32 retains a small amount of wobble since, at the tip portion 32, the flail 6 is not acted upon by the stabilizing effects of the outboard surface 24 of the lip 21 at this radial position.

It will be appreciated that the circumferential lip 21 of the guide and guard 4 includes an inboard surface 25 which may be indexed against a vertical sidewalk edge 26 (FIG. 2) as the guide and guard 4 is rolled along the corner 28 of the sidewalk. As previously mentioned, a depth gage in the form of a ring 13 is detachably secured to the inboard side of the guide and guard 4 at juncture 27 to provide vertical indexing as the guide and guard 4 is rolled along the sidewalk during an edging operation. The outside surface 16 of the depth gage or ring 13, which extends perpendicularly to the plane of rotation of the flail 6, bears against the top surface 29 of the sidewalk when the guide and guard 4 is positioned at the corner 28 of the sidewalk. This provides a positive vertical limit or stop for the guide and guard 4 to prevent the guide and guard 4 from descending too far into the soil 30 and thus producing a larger and/or wider than desirable groove 31.

It will be appreciated that both horizontal and vertical positive indexing is provided by the combined guide and guard 4 shown in FIG. 2 since the inboard surface 25 of the circumferential lip 21 provides horizontal indexing against the side edge 26 of the sidewalk and, as explained above, the outer surface 16 of the ring 13 provides simultaneous vertical indexing during the edging operation. To provide this simultaneous horizontal and vertical indexing, the outside surface 16 of the ring 13 and the inboard surface 25 of the lip 21 meet preferably at right angles so that they may simultaneously bear against the top surface 29 and side edge surface 26 of the sidewalk during the edging operation.

The depth gage may be alternatively formed integrally with the guide and guard 4 by, for example, simple molding the guide and guard 4 to include an annular outside surface which meets the inboard surface 25 of the circumferential lip 21 at right angles in the same manner as the outside surface 16 of the ring 13. However, the detachable ring 13 has certain inherent advantages since, when the ring is removed, the trimmer is much more easily maneuvered around irregularly shaped objects. Also, with the ring 13 detached the trimmer 1 may be used in a wider range of angles to trim vegetation around buildings, sidewalks and trees, for example.

To remove the ring 13 from the cone portion 20 of the guide and guard 4, the cutting head 5 is first removed from the lower end of the handle shaft 2 and the clamp collar is then loosened by unthreading the bolt 8 to allow the user to remove the guide and guard 4 by sliding it down the shaft 2. The screw fasteners 15 are then unthreaded from the ring supports 14 to detach the ring 13 from the cone portion 20 of the guide and guard 4. The guide and guard 4 may then be reattached in a rotatable fashion to the shaft housing 2 by reversing the detachment procedure stated above.

Figure 4:
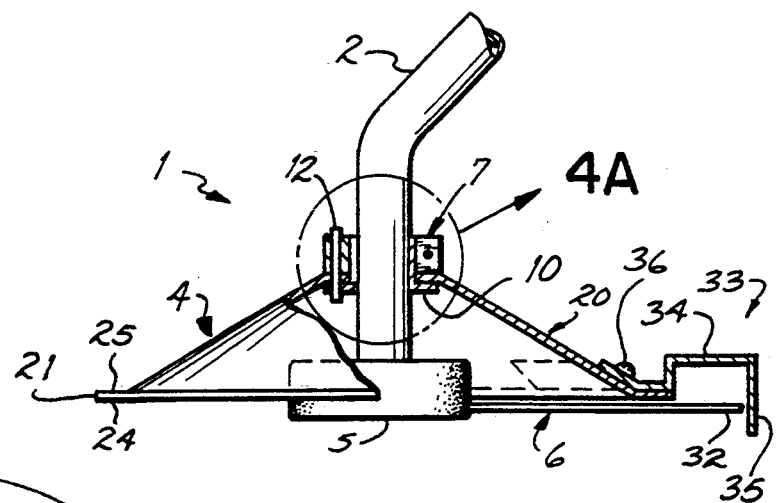
FIG. 4 is a cross sectional view of the trimmer shown in FIG. 3 taken along line 4—4.
Figure 3:
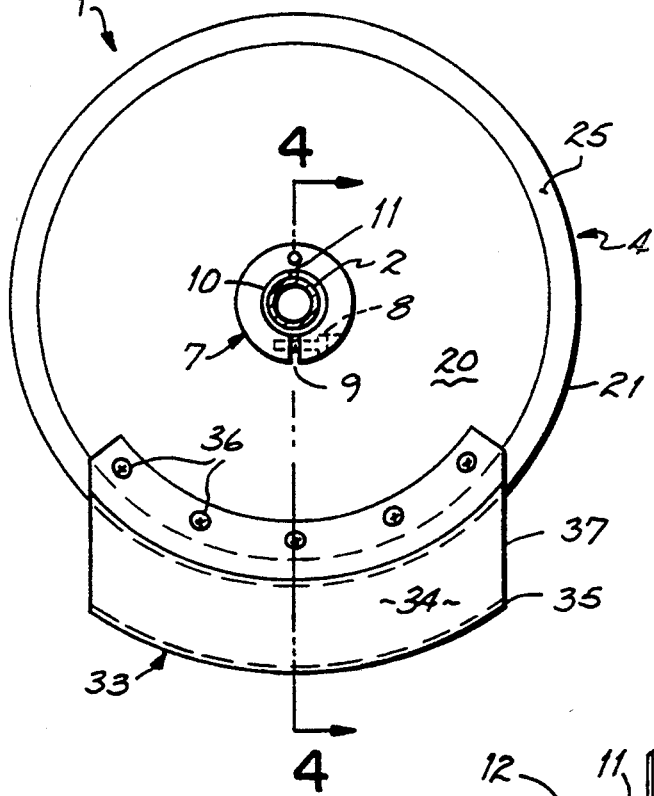
FIG. 3 is top view of a second embodiment of the invention having a detachable rear guard.
Figure 4A:
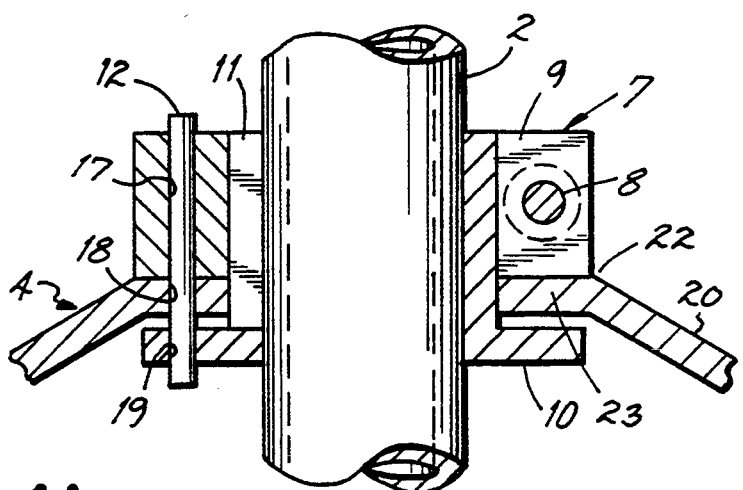
FIG. 4A is an enlarged view of encircled portion 4A of FIG. 4 showing the attachment of the guide/guard to the handle of the trimmer.

A second embodiment of the present invention is illustrated in FIGS. 3, 4 and 4A in which like reference numerals refer to like parts of the invention described in connection with FIGS. 1 and 2. In this second embodiment, a rear guard 33 is attached to the guide and guard 4 of the trimmer 1 to protect the operator from thrown debris. The guide and guard 4 of this embodiment is designed similarly to the guide and guard 4 of the first embodiment of the invention except that the depth gage or ring 13 has been removed and modifications have been made to the attachment means between the guide and guard 4 to the handle shaft 2.

FIG. 4A illustrates the attachment of the guide and guard 4 to the handle shaft 2 at the upper or inboard end 22 of the truncated cone 20. At this location, an annular lip 23 extends radially inwardly from the upper or inboard end 22 of the truncated cone 20 and is contained and rotates within a space between a clamping collar 7 and bushing 10. The clamping collar 7 and bushing 10 have respective slots 9 and 11 which allow the clamping collar 7 and bushing 10 to contract as the bolt 8 is turned. Normally, and in the case of the embodiment shown in FIGS. 1 and 2, the arrangement of the clamp collar 7 and bushing 10 allows the guide and guard 4 to rotate about the handle shaft 2. However, in the embodiment shown in FIG. 4A, a pin 12 has been inserted through apertures 17, 18 and 19 in the clamp 7, annular lip 23 of the guide and guard 4, and the bushing 10, respectively. The pin 12 may, for example, take the form of a conventional cotter pin, roll pin, threated bolt or any other suitable conventional fastener.

By inserting the pin 12 through the clamp collar 7, guide and guard 4, and the bushing 10, the guide and guard 4 is fixed or nonrotatably attached to the handle shaft 2. Once the guide and guard 4 is fixed in a nonrotatable position, the rear guard 33 is attached to the truncated cone 20 by, for example, screw fasteners 36. Of course, other obvious manners of quickly attaching the rear guard 33 to the truncated cone 20 may be used without departing from the scope of the invention.

The rear guard 33 includes a raised portion 34 adapted to extend inboard of the circumferential lip 21 when the guard 33 is attached to the truncated cone 20. This raised portion 34 allows the tip 32 of the flail to rotate beneath the guard 33 without hitting the leading edge 37 of the guard 33 as the flail spins, for example, in a clockwise direction (see. FIG. 3). Without the raised portion 34 of the guard 33, the tip 32 of the flail 6 might, due to its wobble, strike the edge of the guard 33 extending from the lip 21.

The rear guard 33 further includes a downwardly extending portion 35, which extends below the plane of the rotating flail 6 to shield the tip 32 of the flail 6. By fixing the guide and guard 4 in a nonrotatable position and attaching the rear guard 33 such that it is positioned between the rotating flail 6 and the operator, the operator is protected from thrown debris during trimming operations in which the guide and guard 4 is used in a generally horizontal orientation.

Figure 5:
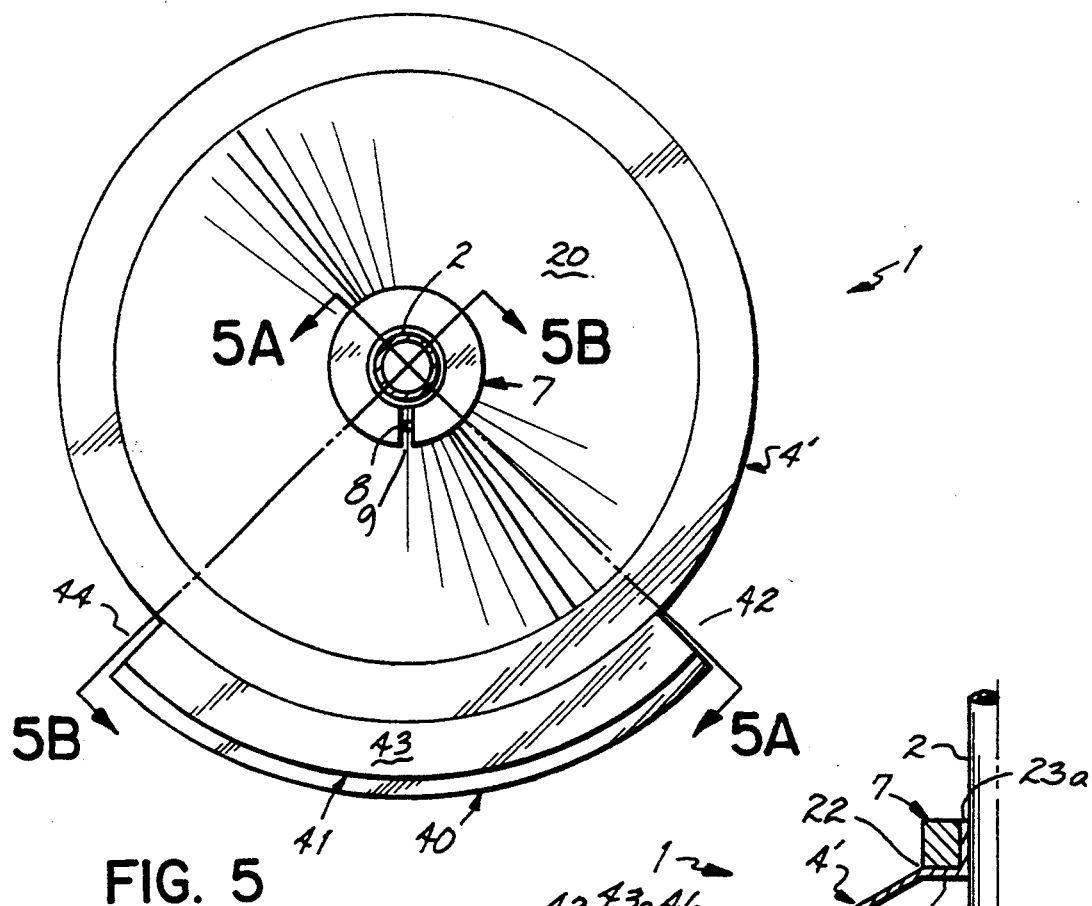
FIG. 5 is a top view of a third embodiment of the invention including a flail stabilizing tunnel in a portion of the guide/guard of the trimmer.
Figure 5A:
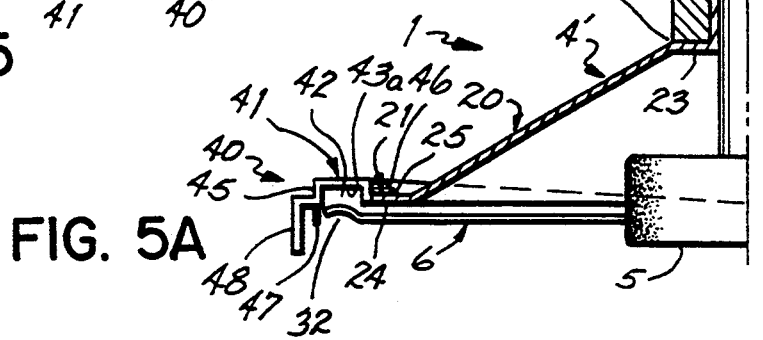
FIG. 5A is a cross sectional view of the guide/guard of FIG. 5 taken along line 5A—5A.
Figure 5B:
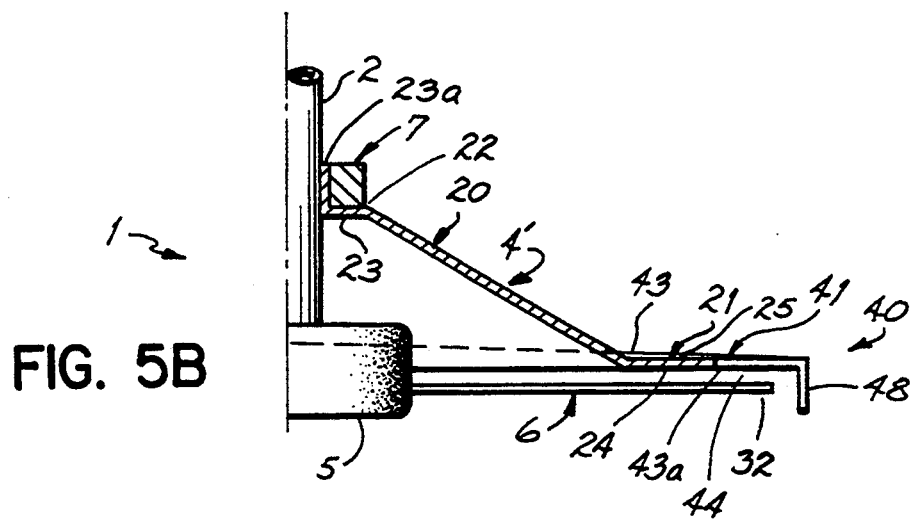
FIG. 5B is a cross sectional view of the guide/guard of FIG. 5 taken along line 5B—5B.
Figure 6:
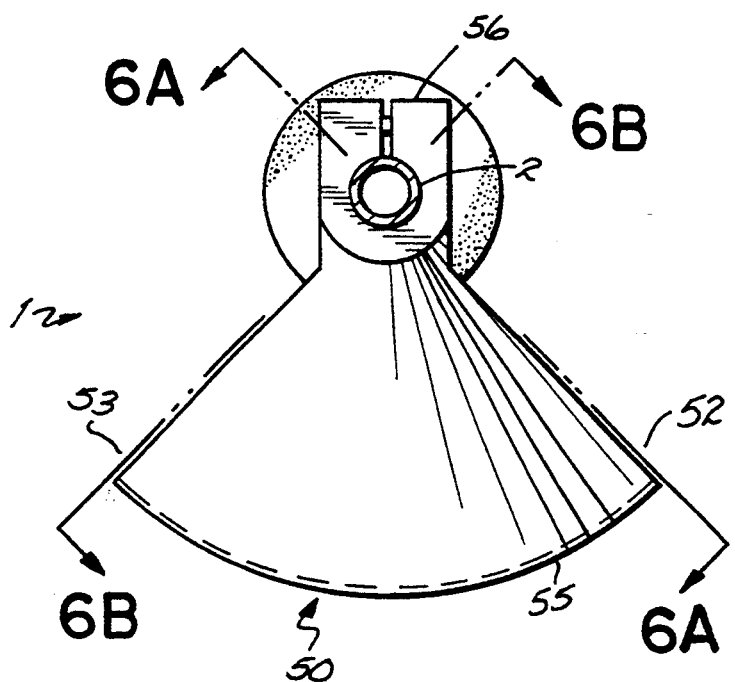
FIG. 6 is a top view of a fourth embodiment of the invention showing an alternative flail stabilizing guard structure.
Figure 6A:
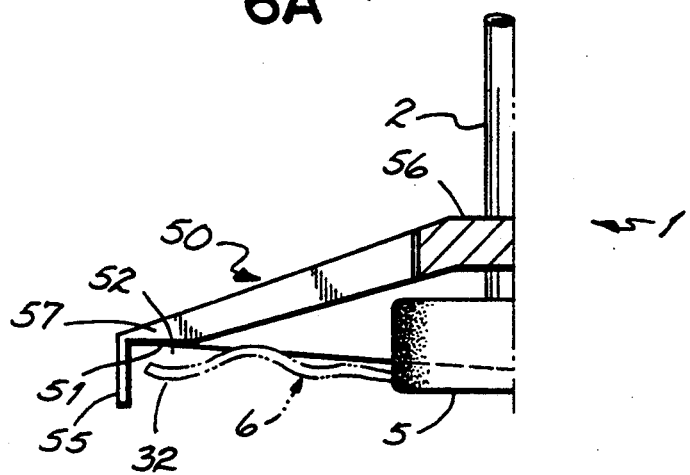
FIG. 6A is a cross sectional view of the guard of FIG. 6 taken along line 6A—6A; and, FIG. 6B is a cross sectional view of the guard of FIG. 6 taken along line 6B—6B.
Figure 6B:
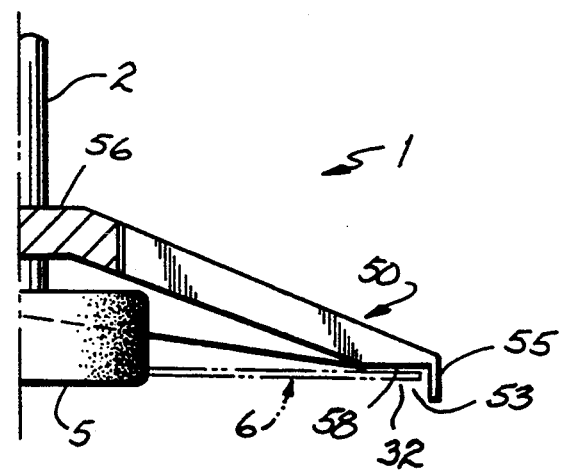

FIGS. 5 and 6 illustrate third and fourth embodiments of the invention which are both concerned with significantly reducing the wobble of the rotating flexible flail. The embodiment shown in FIGS. 5, 5A and 5B is directed to stabilizing the tip portion 32 of the flail 6 when using a nonrotating guard structure having a flail stabilizing annular surface such as the circumferential lip 21 shown in FIGS. 1–4. The embodiment shown in FIGS. 6, 6A and 6B is directed to stabilizing the entire length of a rotating flail on a trimming apparatus not having such an annular flail stabilizing surface.

In FIG. 5, a nonrotatable guide and guard 4' is shown and is an adaptation of the guide and guard 4 shown in FIGS. 1–4. The guide and guard 4' includes an integrally formed rear or secondary guard 40 extending radially outwardly from the circumferential lip 21 of the guide and guard 4'. The secondary guide 40 preferably extends along a 90° portion of the circumference of the guide and guard 4' and is adapted to be positioned between the rotating flexible flail 6 and the operator during use. The secondary or rear guard 40 includes a flail stabilizing tunnel 41 positioned immediately radially outward of the circumferential lip 21 of the guide and guard 4'. As with the embodiments of FIGS. 1–4, the distance between the outboard surface 24 of the circumferential lip 21 and the flail 6 has been greatly exaggerated for illustrative purposes. As previously mentioned the flail 6 is designed to bear against the outboard surface 24 during rotation to produce a stabilizing effect on the flail 6 and reduce its wobble.

FIG. 5A shows the rotating flexible flail 6 as its tip portion 32, rotating in a clockwise direction, enters the tunnel 41 at its capture portion or entrance 42. A flail cutter 47 is located adjacent the tunnel entrance 42 to cut the flail to the proper length before the flail enters the tunnel 41. As previously mentioned in connection with the embodiment of FIGS. 1 and 2, this tip portion 32 of the flexible flail 6 will have a certain amount of wobble in the portion 32 of the flail which extends radially outward of the circumferential lip 21. That is, the wobble begins where the stabilizing effect of the circumferential lip 21 ends. As further shown in FIG. 5A, the wobble exists in a direction transverse to the flail's plane of rotation.

The tunnel 41 includes sidewall portions 45, 46 extending in an inboard direction and generally perpendicularly to the circumferential lip 21. The side wall portions 45, 46 of the tunnel are connected by a top wall 43 having a top interior surface 43a. The top interior surface 43a of the tunnel 41 slopes in an outboard direction from the entrance or capture portion 42 of the tunnel 41 to the exit 44 of the tunnel 41.

As shown in FIG. 5B, the exit 44 of the tunnel 41 is preferably flush or even with the outboard surface 24 of the circumferential lip 21. The flexible flail tip thus enters the tunnel, engages the top interior sloping surface 43a and is gently urged back to its preferred cutting plane. Excessive wobble is reduced or attenuated at each revolution of the flail. Thus, the entire length of the flexible flail 6 is effectively stabilized as it rotates out of the tunnel 41 at the exit 44 and begins to rotate about the approximately 270° portion of the guard 4' in which the tip 32 of the flail 6 is exposed outwardly of the circumferential lip 21 to perform the cutting action.

As is further shown in FIGS. 5A and 5B, the rear guard 40 further includes a rear vertical wall portion 48 extending in an outboard direction through the plane of rotation of the flail 6 to act as a shield between the flail 6 and the operator. Also, the attachment between the guide and guard 4' and the handle shaft 2 has been simplified since the guide and guard 4' is not designed to rotate in this embodiment due to the addition of the radially extending rear or secondary guard 40. Therefore, in this embodiment, the guide and guard 4' is simply clamped to the handle shaft 2 by a clamp collar 7. For this purpose, the inwardly extending annular lip 23 located at the top or inboard end 22 of the truncated cone 20 includes an upwardly extending portion 23a which is clamped against the handle shaft 2 by the clamp collar 7. The clamp collar 7 includes a clamping bolt (not shown) which is identical to the clamping bolt 8 shown in FIGS. 1 and 2.

FIG. 6 illustrates a fourth embodiment of the invention in the form of a partial guard 50 rigidly secured to the handle shaft 2 of a trimmer. The guard 50 attached between the rotating flexible flail 6 and the operator during use and is designed to significantly reduce the inherent wobble along the entire length of the flexible flail 6 as it rotates beneath the guard 50. In a manner similar to the tunnel 41 in the previous embodiment, the guard 50 includes a ramp or top surface 51 which slopes in an outboard direction from an entrance end 52 to an exit end 53 of the guard 50. The guard 50 is designed to cover approximately a 90° segment of the flail's path of rotation, however, this segment may be increased or decreased in size according to the needs of the user.

The sloping outboard surface or ramp 51 of the guard 50 begins at the entrance end 52 at a height sufficient to capture the end portion 32 of the flail 6 without having the tip 32 hit the edge 57 of the guard 50 at the entrance end 52. As the flail 6 rotates beneath the guard 50, the amplitude of the wobble of the flail 6 is gradually reduced until the flail reaches the exit end 53 of the ramp 51. At this point during its rotation, the flail 6 has been straightened out or stabilized as shown in FIG. 6B, such that a clean, even cut may be made during the 270° of flail rotation which the guard 50 does not cover. The stabilizing effect of the guard 50 thus causes the flail 6 to rotate essentially in a plane immediately outboard of the outboard surface 58 of the guard 50 at the exit end 53. Ideally, the flail 6 will be stabilized and bear against the outboard surface 58 of the exit end 53 of the guard 50 as the flail 6 rotates.

The guard 50 further includes a rear vertical wall portion 55 extending in an outboard direction through the plane of rotation of the flail 6 to act as a shield between the flail 6 and the operator. The guard 50 is easily attached to any conventional trimmer by securing the clamp portion 56 of the guard 50 around the handle shaft 2 as shown in FIG. 6.

It will thus be appreciated that the present invention provides guide and guard structures which are easily adaptable to existing trimmers as after market add-ons or which may be supplied as original equipment with trimmers. In either case, the trimmer may be supplied with a guide and guard structure which has one or more of the following advantages.

First, positive vertical and horizontal indexing has been made possible by the present invention such that, during an edging operation, a trimmer incorporating the principles of the present invention may be used to produce a clean, uniform cut along the edge of a sidewalk, for example.

Second, a multi-use trimmer has been provided through means for fixing a rotatable guide and guard in a nonrotatable position and attaching a rear guard for further protecting the operator. Thus, the trimmer may be used during both edging and conventional, horizontally oriented trimming operations and the operator will be protected in both situations.

Finally, the invention provides for cleaner, more even horizontal cuts in grass, for example, through the use of a guard having improved line or flail stabilization structure.

While I have described preferred embodiments of the present invention, those skilled in the art will readily recognize further advantages, adaptations and modifications without departing from the scope of the invention and I intend to be limited only by the claims appended hereto.

I claim:

1. Apparatus for trimming and edging lawns comprising:
   a handle having an upper end and a lower end,
   drive means mounted on said handle,
   a rotatable cutting head mounted proximate the lower end of said handle,
   a rotatable drive shaft operably connected to and extending from said drive means to said cutting head for driving said cutting head,
   flexible flail means extending outwardly from said cutting head and generally perpendicular to an axis of rotation of said cutting head during operation,
   first guard means supported on said apparatus inboard of said cutting head proximate said lower end of said handle for shielding a user from debris generated by said cutting head, said first guard means providing 360° coverage of said flexible flail means and including a circumferential lip extending outwardly at the periphery of said first guard means and inboard of said flexible flail means,
   second guard means for shielding a user from said flexible flail means and debris generated during a trimming operation, and
   means for removably attaching said second guard means to said first guard means,
   wherein a portion of said second guard means extends outwardly from the periphery of said circumferential lip when said second guard means is attached to said first guard means so as to shield an outer portion of said flail means as said flail means rotates.

2. A guard for use with a flexible flail trimmer at a position on said trimmer which is inboard of a rotatable flexible flail thereof, said guard comprising:
   a shield having an inboard surface and an outboard surface, said inboard surface for facing a handle of said trimmer and said outboard surface for facing said flexible flail when said guard is attached to said trimmer, and
   means on at least a portion of said outboard surface for reducing wobble in said flexible flail as said flail rotates, said means comprising a sloping portion of said outboard surface, said sloping portion being outboardly inclined in a direction of rotation of said flexible flail.

3. The guard of claim 2 wherein said shield comprises a generally triangularly shaped structure for extending less than 360° about said trimmer handle.

4. The guard of claim 2 wherein said shield comprises a generally circular structure for extending 360° about said trimmer handle.

5. The guard of claims 3 or 4 wherein said shield includes a peripheral portion extending transversely to said sloping portion and being adapted to shield an outer end of said flexible flail as said flexible flail rotates.

6. The guard of claim 5 wherein said shield includes a circumferential lip extending from the outer periphery of said shield substantially parallel to and inboard of said flexible flail when said shield is attached to said trimmer, said sloping portion of said outboard surface being contained within an angular portion of said shield, said angular portion comprising a second, outer guard which extends outwardly from the periphery of said circumferential lip and outboard of said circumferential lip so as to shield an outer portion of said flail means as said flail means rotates.

7. The guard of claim 6 wherein said sloping portion comprises a tunnel in said second, outer guard and open along an outboard side of said second, outer guard, said tunnel having an flail entrance end and a flail exit end, said entrance end being a tunnel opening which extends inboard of said circumferential lip, said tunnel further having a top surface which slopes from said entrance end to said exit end in an outboard direction.

8. The guard of claim 7 wherein said exit end of said tunnel is substantially flush with an outboard surface of said circumferential lip.

9. Apparatus for trimming vegetation comprising:
a handle having an upper end and a lower end,
drive means mounted on said handle,
a rotatable cutting head mounted proximate the lower end of said handle,
a rotatable driveshaft operably connected to and extending from said drive means to said cutting head for driving said cutting head,
flexible flail means extending outwardly from said cutting head and rotatable with said cutting head,
guard means supported on said apparatus inboard of said cutting head for shielding a user from debris generated by said cutting head, said guard means having an inboard surface and an outboard surface, said inboard surface adapted to face said upper end of said handle and said outboard surface adapted to face said flexible flail means when said guard is attached to said apparatus, and
stabilizing means on at least a portion of said outboard surface for stabilizing and reducing wobble in said flexible flail means as said flexible flail means rotates, said stabilizing means comprising a sloping portion of said outboard surface, said sloping portion being outboardly inclined in a direction of rotation of said flexible flail.

10. The apparatus of claim 9 wherein said guard means comprises a guard structure extending less than 360° about said cutting head.

11. The apparatus of claim 9 wherein said guard means comprises a generally circular structure extending 360° about said cutting head.

12. The apparatus of claims 10 or 11 wherein said guard means includes a peripheral portion extending transversely to said sloping portion and being adapted to shield an outer end of said flexible flail means as said flexible flail means rotates.

13. The apparatus of claim 11 wherein said guard means includes a circumferential lip extending from the outer periphery of said guard means substantially parallel to and inboard of said flexible flail, said sloping portion of said outboard surface being contained within an angular portion of said guard means, said angular portion having a second, outer guard portion which extends outwardly from the periphery of said circumferential lip and outboard of said circumferential lip so as to shield an outer portion of said flail means as said flail means rotates.

14. The apparatus of claim 13 wherein said sloping portion comprises a tunnel in said second, outer guard and open along an outboard side of said second, outer guard, said tunnel having a flail entrance end and a flail exit end, said entrance end being a tunnel opening which extends inboard of said circumferential lip, said tunnel further having a top surface which slopes from said entrance end to said exit end in an outboard direction.

15. The apparatus of claim 14 wherein said exit end of said tunnel is substantially flush with an outboard surface of said circumferential lip.

16. A flexible flail trimmer apparatus comprising:
a flexible flail carried by said apparatus for rotation about an axis through a radial plane for trimming vegetation; and
a flail stabilizer carried by said apparatus and comprising a flail engaging surface detached from said flail but disposed substantially in a plane at least adjacent said flail for engaging and stabilizing said flail against wobble as said flail rotates relative to said flail stabilizer, said flail engaging surface being sloped from a flail entry end to a flail exit end of said flail engaging surface.

17. Apparatus as in claim 16 wherein said flail engaging surface comprises a ramp inclined toward said radial plane of flail movement and extending in a direction of such movement less than 360 degrees.

18. Apparatus as in claim 16 wherein said flail engaging surface comprises an inclined surface inclined toward said radial plane of movement of said flail in a direction of movement thereof.

19. Apparatus as in claim 18 wherein said inclined surface extends less than 360 degrees about said axis.

* * * * *